United States Patent
Agarwal et al.

(10) Patent No.: US 12,299,847 B2
(45) Date of Patent: May 13, 2025

(54) SYSTEMS FOR SINGLE IMAGE REFLECTION REMOVAL

(71) Applicant: Adobe Inc., San Jose, CA (US)

(72) Inventors: Aarsh Prakash Agarwal, Lucknow (IN); Harshit Nyati, Kota (IN)

(73) Assignee: Adobe Inc., San Jose, CA (US)

( * ) Notice: Subject to any disclaimer, the term of this patent is extended or adjusted under 35 U.S.C. 154(b) by 421 days.

(21) Appl. No.: 17/718,579

(22) Filed: Apr. 12, 2022

(65) Prior Publication Data

US 2023/0325981 A1    Oct. 12, 2023

(51) Int. Cl.
*G06T 5/60*    (2024.01)
*G06T 5/70*    (2024.01)

(52) U.S. Cl.
CPC ...... *G06T 5/70* (2024.01); *G06T 2207/20081* (2013.01); *G06T 2207/20172* (2013.01)

(58) Field of Classification Search
CPC ... G06T 2207/20084; G06T 5/77; G06T 7/73; G06T 7/00; G06V 10/82; G06N 3/02; G06N 3/045
See application file for complete search history.

(56) References Cited

U.S. PATENT DOCUMENTS

2023/0360182 A1* 11/2023 Fanello ............... G06T 5/92
2024/0212106 A1*  6/2024 LeGendre ............ G06T 5/94

FOREIGN PATENT DOCUMENTS

CN      113240593 A   *  8/2021  .......... G06N 3/0445
CN      111507910 B   *  6/2023  .......... G06N 3/0454
WO   WO-2022197198 A1 *  9/2022  ....... G06F 18/24137

OTHER PUBLICATIONS

Q. Fan, J. Yang, G. Hua, B. Chen and D. Wipf, "A Generic Deep Architecture for Single Image Reflection Removal and Image Smoothing," 2017 IEEE International Conference on Computer Vision (ICCV), Venice, Italy, 2017, pp. 3258-3267, doi: 10.1109/ICCV.2017.351. (Year: 2017).*

Y. Chang and C. Jung, "Single Image Reflection Removal Using Convolutional Neural Networks," in IEEE Transactions on Image Processing, vol. 28, No. 4, pp. 1954-1966, Apr. 2019, doi: 10.1109/TIP.2018.2880088. (Year: 2019).*

(Continued)

*Primary Examiner* — Bobbak Safaipour
*Assistant Examiner* — Dylan Joseph Sherrillo
(74) *Attorney, Agent, or Firm* — FIG. 1 Patents (57) ABSTRACT

In implementations of systems for single image reflection removal, a computing device implements a removal system to receive data describing a digital image that depicts light reflected by a surface and light transmitted through the surface. The removal system predicts an edge map of a transmitted image for the light transmitted through the surface by processing the data using a first machine learning model trained on a first type of training data. A reflected component is predicted for the light reflected by the surface by processing the data using a second machine learning model trained on a second type of training data. A corrected digital image is generated that does not depict the light reflected by the surface based on the data, the edge map of the transmitted image, and the reflected component.

20 Claims, 7 Drawing Sheets
(4 of 7 Drawing Sheet(s) Filed in Color)

(56) References Cited

OTHER PUBLICATIONS

"How to remove reflection from a glass picture frame?", Adobe Support Community, Adobe Inc., [retrieved Feb. 24, 2022]. Retrieved from the Internet <https://community.adobe.com/t5/photoshop-ecosystem-discussions/how-to-remove-reflection-from-a-glass-picture-frame/td-p/8687477>., Nov. 1, 2016, 9 Pages.

Agrawal, Amit, et al., "Removing photography artifacts using gradient projection and flash-exposure sampling", SIGGRAPH '05: ACM SIGGRAPH 2005 Paper [retrieved Feb. 24, 2022]. Retrieved from the Internet <http://citeseerx.ist.psu.edu/viewdoc/download?doi=10.1.1.644.1301&rep=rep1&type=pdf>., Jul. 1, 2005, 10 Pages.

Fan, Qingnan, et al., "A Generic Deep Architecture for Single Image Reflection Removal and Image Smoothing", Cornell University arXiv, arXiv.org [retrieved Feb. 24, 2022]. Retrieved from the Internet <https://arxiv.org/pdf/1708.03474.pdf>., Jun. 10, 2018, 30 Pages.

Farid, H, et al., "Separating reflections and lighting using independent components analysis", IEEE Computer Society Conference on Computer Vision and Pattern Recognition (Cat. No PR00149) [retrieved Feb. 24, 2022]. Retrieved from the Internet <https://web.archive.org/web/20060922045854id_/http://www.cs.dartmouth.edu/farid/publications/pvpr99.pdf>., 1999, 6 Pages.

Fu, Ying, et al., "Separating Reflective and Fluorescent Components Using High Frequency Illumination in the Spectral Domain", Proceedings of the IEEE International Conference on Computer Vision (ICCV)[retrieved Feb. 24, 2022]. Retrieved from the Internet <https://ebajapan.jp/assets/pdf/sato_imari.pdf>., May 2016, 8 Pages.

Han, Byeong-Ju, et al., "Reflection Removal Using Low-Rank Matrix Completion", IEEE Conference on Computer Vision and Pattern Recognition (CVPR) [retrieved Feb. 24, 2022]. Retrieved from the Internet <https://openaccess.thecvf.com/content_cvpr_2017/papers/Han_Reflection_Removal_Using_CVPR_2017_paper.pdf>., 2017, 9 Pages.

Li, Yu, et al., "Exploiting Reflection Change for Automatic Reflection Removal", IEEE International Conference on Computer Vision [retrieved Feb. 24, 2022]. Retrieved from the Internet <https://www.eecs.yorku.ca/~mbrown/pdf/iccv2013_liyu_reflection_separation.pdf>., 2013, 8 Pages.

Li, Yu, et al., "Single Image Layer Separation using Relative Smoothness", IEEE Conference on Computer Vision and Pattern Recognition (CVPR) [retrieved Feb. 24, 2022]. Retrieved from the Internet <http://yu-li.github.io/paper/i_cvpr14_layer.pdf>., 2014, 8 Pages.

Niklaus, Simon, et al., "Learned Dual-View Reflection Removal", Cornell University arXiv, arXiv.org [retrieved Feb. 24, 2022]. Retrieved from the Internet <https://arxiv.org/pdf/2010.00702.pdf>., Oct. 1, 2020, 10 Pages.

Ronneberger, Olaf, et al., "U-Net: Convolutional Networks for Biomedical Image Segmentation", Cornell University arXiv, arXiv.org [retrieved Feb. 24, 2022]. Retrieved from the Internet <https://arxiv.org/pdf/1505.04597.pdf>., May 18, 2015, 8 pages.

Simonyan, Karen, et al., "Very Deep Convolutional Networks for Large-Scale Image Recognition", arXiv Preprint, Cornell University, arXiv.org [retrieved Feb. 24, 2022]. Retrieved from the Internet <https://arxiv.org/pdf/1409.1556.pdf>., Sep. 2014, 14 pages.

Szeliski, Richard, et al., "Layer extraction from multiple images containing reflections and transparency", IEEE Conference on Computer Vision and Pattern Recognition [retrieved Feb. 24, 2022]. Retrieved from the Internet <https://citeseerx.ist.psu.edu/viewdoc/download?doi=10.1.1.133.4231&rep=rep1&type=pdf>., 2000, 8 Pages.

Wan, Renjie, et al., "Benchmarking Single-Image Reflection Removal Algorithms", IEEE International Conference on Computer Vision (ICCV) [retrieved Feb. 24, 2022-]. Retrieved from the Internet <http://alumni.media.mit.edu/~shiboxin/files/Wan_ICCV17.pdf>., 2017, 9 Pages.

Wei, Kaixuan, et al., "Single Image Reflection Removal Exploiting Misaligned Training Data and Network Enhancements", IEEE/CVF Conference on Computer Vision and Pattern Recognition [retrieved Feb. 24, 2022]. Retrieved from the Internet <https://jlyang.org/cvpr19_reflectionremoval.pdf>., Apr. 1, 2019, 10 pages.

Wieschollek, Patrick, et al., "Separating Reflection and Transmission Images in the Wild", Cornell University arXiv, arXiv.org [retrieved Feb. 24, 2022]. Retrieved from the Internet <https://arxiv.org/pdf/1712.02099.pdf>., Aug. 16, 2018, 16 Pages.

Zhang, Xuaner, et al., "Single Image Reflection Separation with Perceptual Losses", Cornell University arXiv, arXiv.org [retrieved Feb. 24, 2022]. Retrieved from the Internet <https://arxiv.org/pdf/1806.05376.pdf>., Jun. 14, 2018, 9 Pages.

\* cited by examiner

402
Receive data describing a digital image that depicts light reflected by a surface and light transmitted through the surface

404
Predict an edge map of a transmitted image for the light transmitted through the surface by processing the data using a first machine learning model trained on a first type of training data to predict edge maps of transmitted images

406
Predict a reflected component for the light reflected by the surface by processing the data using a second machine learning model trained on a second type of training data to predict reflected components

408
Generate a corrected digital image that does not depict the light reflected by the surface based on the data, the edge map of the transmitted image, and the reflected component

SYSTEMS FOR SINGLE IMAGE REFLECTION REMOVAL

BACKGROUND

When a digital image is captured that depicts a transparent surface (e.g., a photograph taken through a window), the captured image typically also depicts light reflected by the surface which is undesirable because the reflected light obscures objects intended to be depicted in the digital image. In order to avoid capturing such reflections, professional photographers employ a variety of elaborate setups (e.g., using cross polarized lighting) which are not practical for non-professional photographers and also must be implemented before capturing the digital image. For example, these professional setups are generally not usable to avoid capturing reflections in digital images depicting moving objects or in digital images that are captured from moving objects (e.g., through a window of a car or plane).

Some conventional systems for removing reflections captured in digital images rely on multiple captured images that depict a same scene such as a first image depicting an object captured using a camera flash and a second image depicting the object captured without using the camera flash. These systems process the multiple captured images to identify and remove reflections depicted in the multiple images. However, capturing the multiple images generally must be performed before it is known whether a first captured image depicts reflected light which is burdensome and unnecessarily consumes storage capacity of an image capture device used to capture the multiple images if the first captured image does not depict an undesirable reflection.

Other conventional systems for removing light reflected by a surface that is depicted in a single digital image attempt to predict a reflection-free image based on various kinds of losses and information included in the single digital image. Because these conventional systems rely on a limited amount of information about the single digital image, the systems are unable to accurately remove all the reflections depicted high-contrast images with multiple reflections. For example, the conventional systems are unable to distinguish between the multiple reflections and the objects intended to be depicted in the single digital image which is a shortcoming of the conventional systems.

SUMMARY

Techniques and systems are described for single image reflection removal. In an example, a computing device implements a removal system to receive data describing a digital image that depicts light reflected by a surface and light transmitted through the surface. For instance, the surface is a window or a transparent wall and the light reflected by the surface obscures objects intended to be depicted in the digital image (e.g., objects that reflect the light transmitted through surface).

The removal system predicts an edge map of a transmitted image for the light transmitted through the surface by processing the data using a first machine learning model trained on a first type of training data to predict edge maps of transmitted images. For example, a reflected component is predicted for the light reflected by the surface by processing the data using a second machine learning model trained on a second type of training data to predict reflected components. The removal system generates a corrected digital image that does not depict the light reflected by the surface based on the data, the edge map of the transmitted image, and the reflected component. In one example, the corrected digital imaged depicts the light transmitted through the surface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Conventional systems for removing reflections depicted in a single digital image rely on a limited amount of information (e.g., just the single image) to identify and remove the reflections. Because of the limited amount of information, conventional systems are not capable of identifying all of the reflections depicted in a single high contrast image that depicts multiple reflections. For instance, it is not possible for conventional systems to distinguish between portions of the high contrast image that depict reflected light and portions of the image that depict objects of a captured scene. As a result, conventional systems are not capable of removing all of the reflections from the single image which is a shortcoming of these systems.

In order to overcome the limitations of conventional systems, techniques and systems for single image reflection removal are described. In one example, a computing device implements a removal system to receive input data describing a digital image that depicts light reflected by a surface and light transmitted through the surface. For example, the light reflected by the surface obscures objects intended to be depicted in the digital image that reflect the light transmitted through the surface. In this example, the removal system represents the digital image as a sum of a transmitted image corresponding to the light transmitted through the surface and a reflected component corresponding to the light reflected by the surface.

For instance, the removal system predicts an edge map of the transmitted image for the light transmitted through the surface by processing the input data using a first machine learning model trained on a first type of training data to predict edge maps of transmitted images. The first type of training data includes pairs of transmitted images and corresponding ground truth edge maps for the transmitted images that are generated by gray scaling the transmitted images and computing normalized gradients from the gray scaled images. In one example, the first machine learning model includes an encoder network and a decoder network. In this example, the removal system trains the first machine learning model by predicting edge maps for the transmitted images included in the first type of training data and adjusting weights of the first machine learning model to minimize a mean square loss between the predicted edge maps and the corresponding ground truth edge maps included in the first type of training data.

For example, the removal system predicts the reflected component by processing the input data using a second machine learning model trained on a second type of training data to predict reflected components. The removal system generates a corrected digital image by processing the input data, the edge map for the transmitted image, and the reflected component using a third machine learning model trained on the second type of training data to generate corrected digital images. In one example, the second and third machine learning models each include an encoder network and a decoder network, and the removal system jointly trains the second and third machine learning models on the second type of training data.

The second type of training data includes both synthetic images and photorealistic images as well as ground truth reflected components and ground truth transmitted images. For example, the removal system jointly trains the second machine learning model to predict reflected components and the third machine learning model to generate corrected digital images on the second type of training data to jointly minimize a mean square loss, an L-1 loss, and a perceptual loss that is computed using a pretrained convolutional neural network. Once trained, the third machine learning model generates the corrected digital image as not depicting the light reflected by the surface. In an example, the corrected digital image depicts the light transmitted through the surface.

By using the digital image, the edge map of the transmitted image, and the reflected component to generate the corrected digital image, the described systems generate corrected digital images using more information than the conventional systems which rely on the limited amount of information (e.g., just the digital image) to generate corrected digital images. Because of this additional information, the described systems demonstrate superior single image reflection removal relative to the conventional systems. For example, the reflected component includes information about the light reflected by the surface and the edge map of the transmitted image includes information about contrast and details around the transmitted image. Using this additional information, the described systems are capable of removing all reflections included in a single high contrast image depicting multiple reflections which is not possible using the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
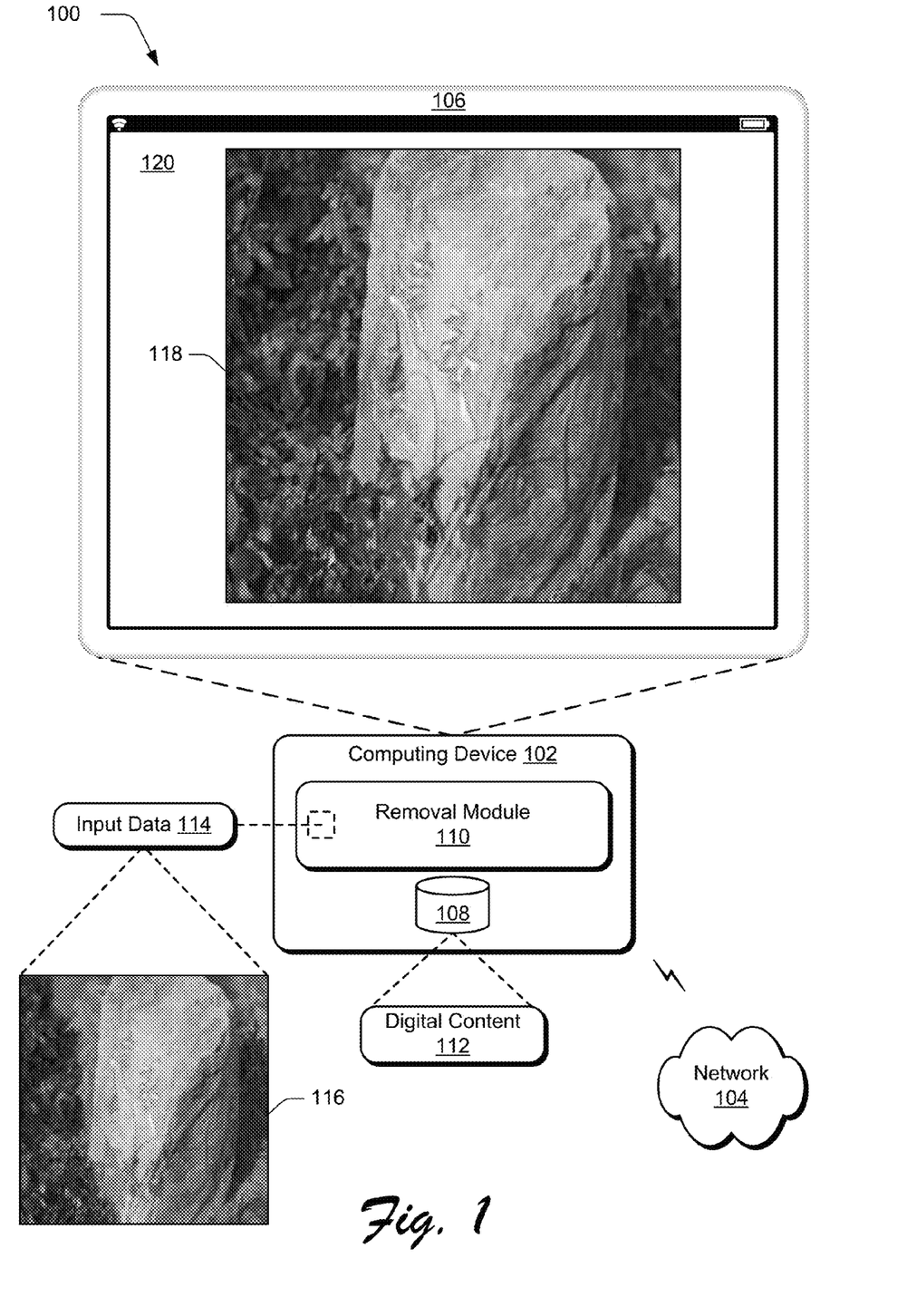
FIG. 1 is an illustration of an environment in an example implementation that is operable to employ digital systems and techniques for single image reflection removal.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a removal module 110. The storage device 108 is illustrated to include digital content 112 such as digital photographs, graphic artwork, digital videos, etc.

The removal module 110 is illustrated as having, receiving, and/or transmitting input data 114 that describes digital images depicting light reflected by a surface. In the illustrated example, the input data 114 describes a digital image 116. As shown, the digital image 116 depicts light reflected by a surface and light transmitted through the surface. For instance, the surface is a window or a transparent wall and the digital image 116 is captured by an image capture device of the computing device 102 and/or the display device 106 such that the surface is disposed between the image capture device and physical objects which reflect the light transmitted through the surface. As a result, the image capture device also captures the light reflected by the surface which is depicted in the digital image 116.

In order to remove the light reflected by the surface from the digital image 116, the removal module 110 processes the input data 114 using a machine learning model. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

The removal module 110 predicts an edge map of a transmitted image for the light transmitted through the surface by processing the input data 114 using a first machine learning model trained on a first type of training data to predict edge maps of transmitted images. For example, the first machine learning model includes an encoder network and a decoder network with Softmax tied at its end, and the first type of training data includes edge maps constructed from transmitted images. In one example, the edge maps included in the first type of training data are constructed by gray scaling transmitted images and computing normalized gradients. In this example, the removal module 110 trains the first machine learning model to minimize a mean square error between edge maps predicted for transmitted images and edge maps constructed from corresponding transmitted images.

The removal module 110 predicts a reflected component for the light reflected by the surface by processing the input data 114 using a second machine learning model trained on a second type of training data to predict reflected components. In an example, the second machine learning model includes an encoder network and a decoder network, and the second type of training data includes synthetic images and photorealistic images. For example, the removal module 110 trains the second machine learning model to minimize a mean square loss, an L-1 loss, and a perceptual loss that is computed using a pretrained convolutional neural network.

The removal module 110 generates a corrected digital image 118 using a third machine learning model that is trained on the second type of training data to generate corrected digital images. As shown, the corrected digital image 118 is displayed in a user interface 120 of the display device 106 and the corrected digital image 118 depicts the light transmitted through the surface. For instance, the corrected digital image 118 does not depict the light reflected by the surface.

For example, the removal module 110 concatenates the input data 114, the edge map for the transmitted image, and the reflected component as an input to the third machine learning model. The third machine learning model includes an encoder network and a decoder network. In one example, the third machine learning model is jointly trained with the second machine learning model on the second type of training data. In this example, the removal module 110 trains the third machine learning model to minimize a mean square loss, an L-1 loss, and a perceptual loss that is computed using the pretrained convolutional neural network.

Consider an example in which the removal module 110 jointly trains the second machine learning model and the third machine learning model on the second type of training data that includes the synthetic images and the photorealistic images. In this example, the second type of training data includes a ground truth reflected component and a ground truth transmitted image for each of the synthetic images. For instance, the removal module 110 does not train the second machine learning model on photorealistic images of the second type of training data that do not include a corresponding ground truth reflection component. As part of the joint training in this example, the third machine learning module learns to remove reflected components from images while preserving transmitted images depicted in the images.

Although systems for single image reflection removal are described as including the first, second, and third machine learning models, it is to be appreciated that in some examples the described systems are implemented using fewer machine learning models or additional machine learning models. In one example, the described systems are implemented using a single machine learning model. In another example, the second and third machine learning models are replaced by a single machine learning model and the described systems are implemented using two machine learning models. For instance, a fourth machine learning model is used to implement systems for single image reflection removal in some examples.

Figure 2:
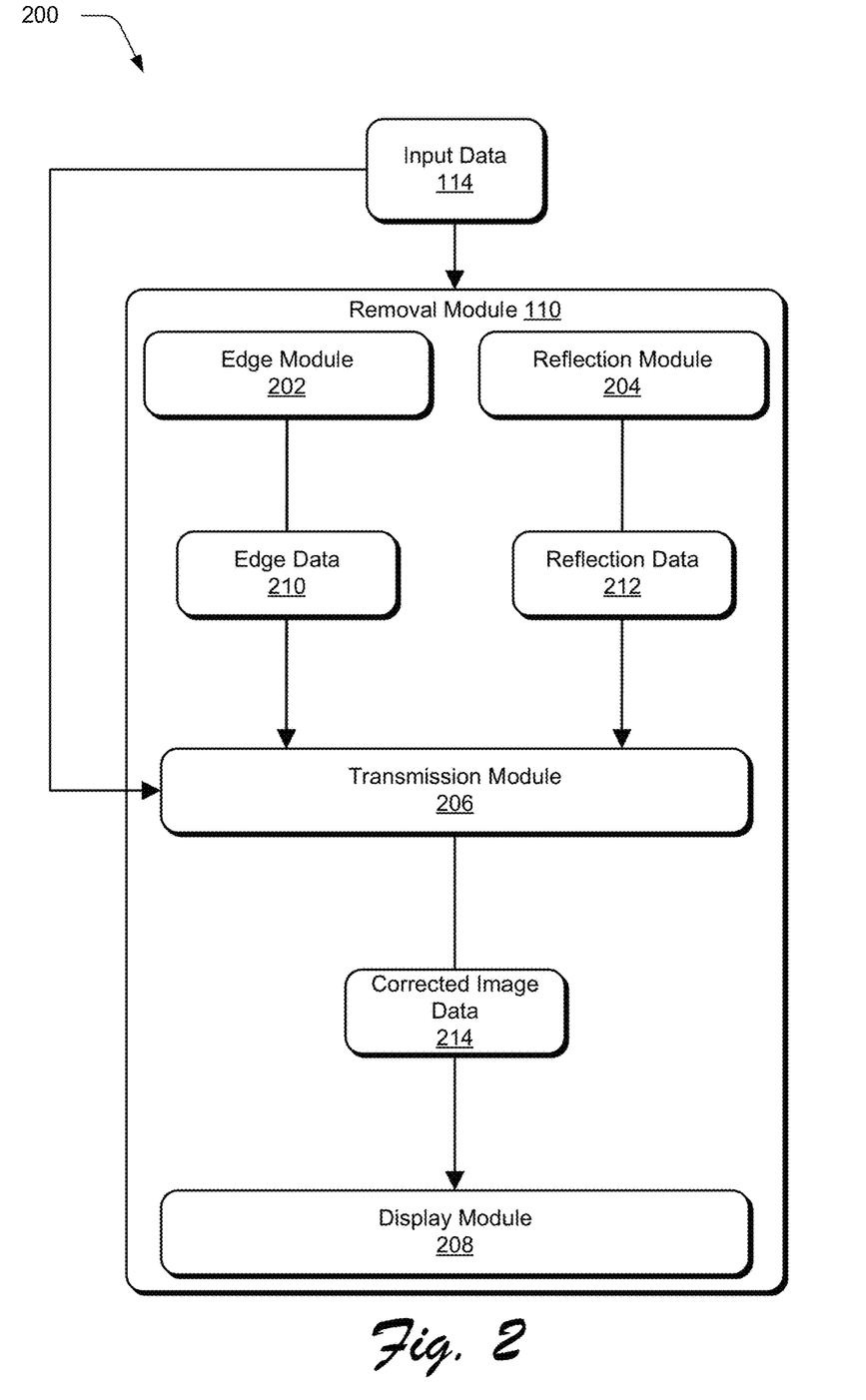
FIG. 2 depicts a system in an example implementation showing operation of a removal module for single image reflection removal.

FIG. 2 depicts a system 200 in an example implementation showing operation of a removal module 110. The removal module 110 is illustrated to include an edge module 202, a reflection module 204, a transmission module 206, and a display module 208. For example, the removal module 110 receives the input data 114 that describes digital images that depict light reflected by a surface. For instance, the edge module 202 receives and processes the input data 114 to generate edge data 210. As shown in FIG. 2, the reflection module 204 receives and processes the input data 114 to generate reflection data 212.

Figure 3A:
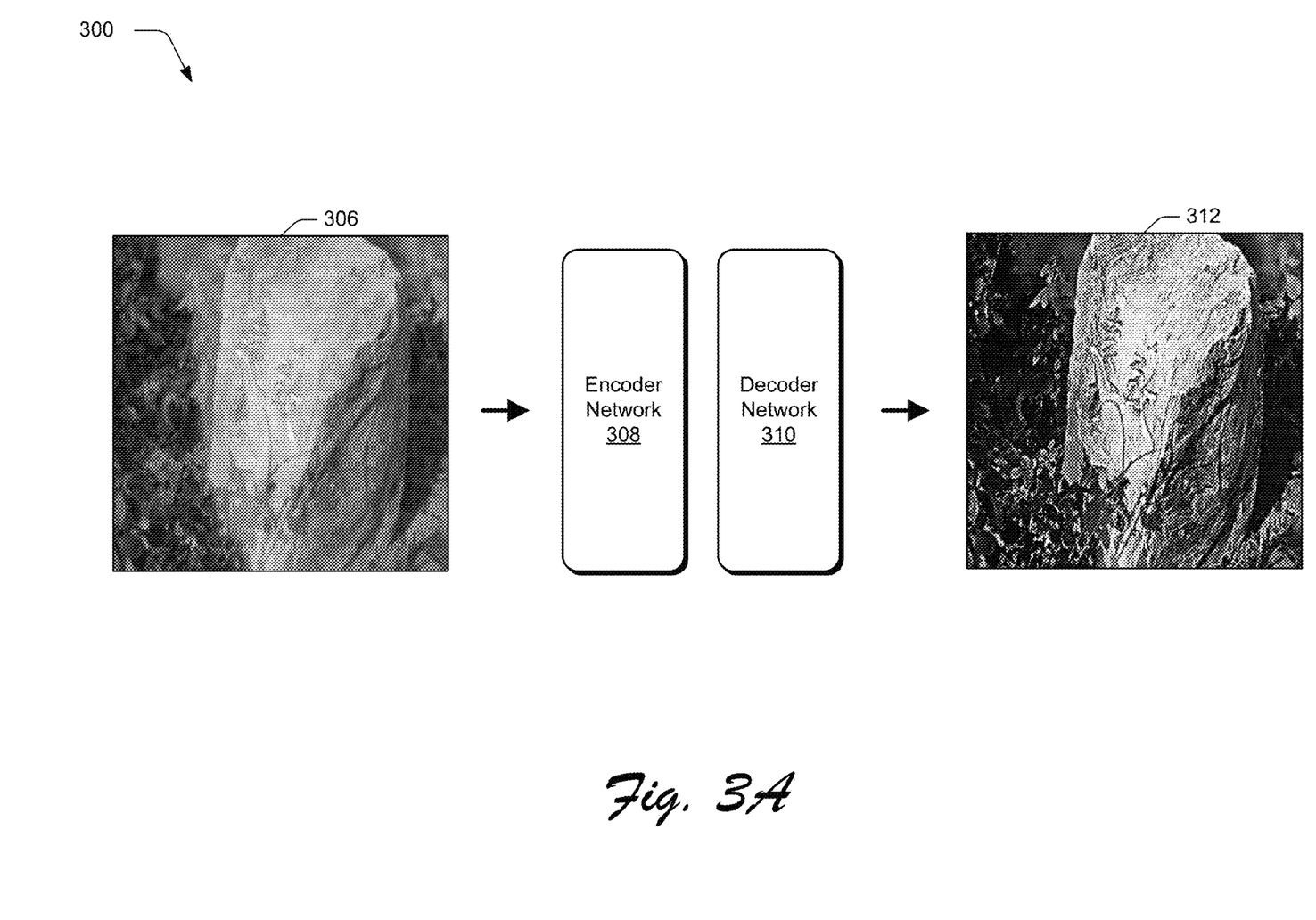
FIGS. 3A, 3B, and 3C illustrate an example of generating a digital image that does not depict light reflected by a surface.
Figure 3B:
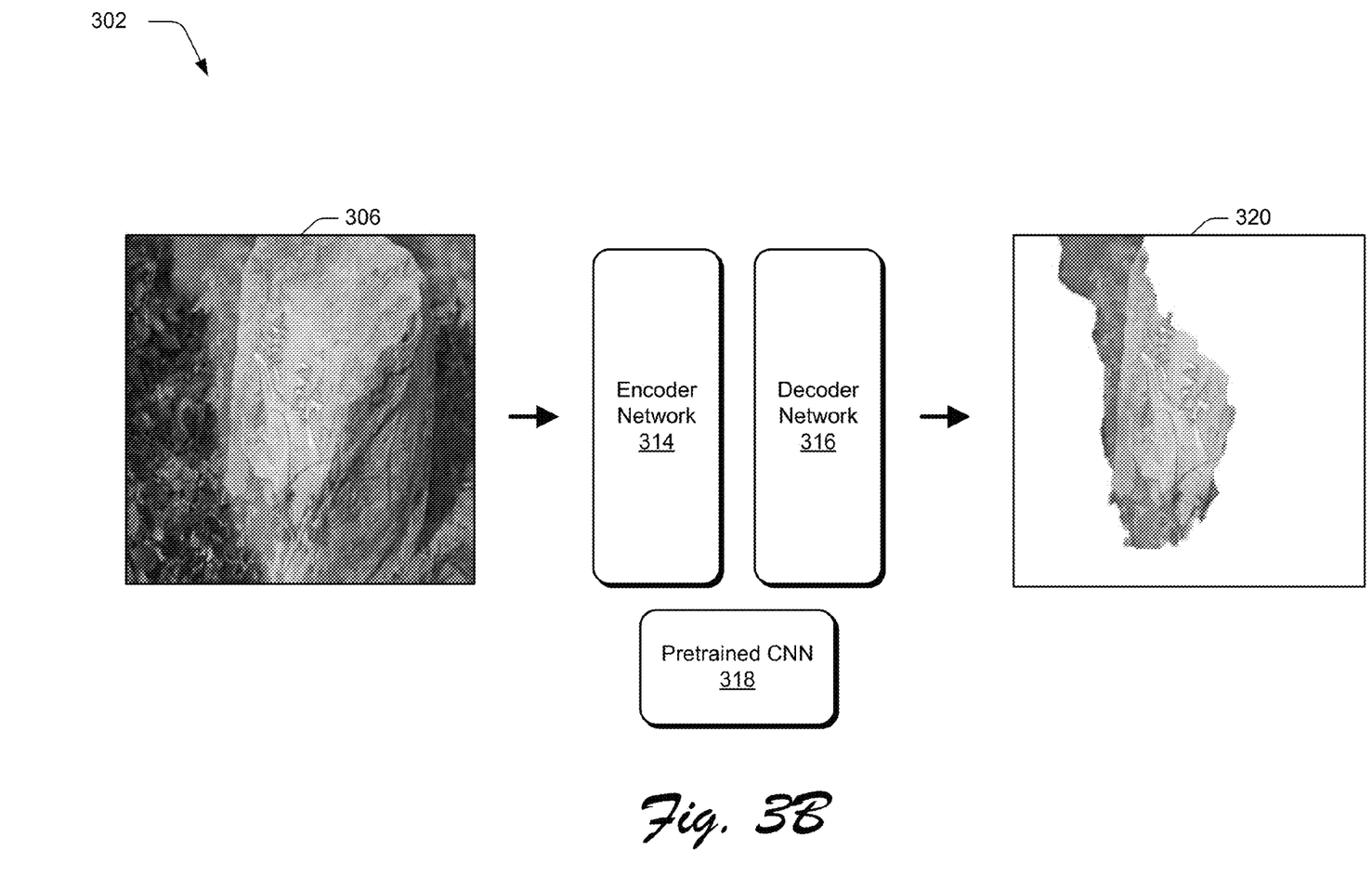
Figure 3C:
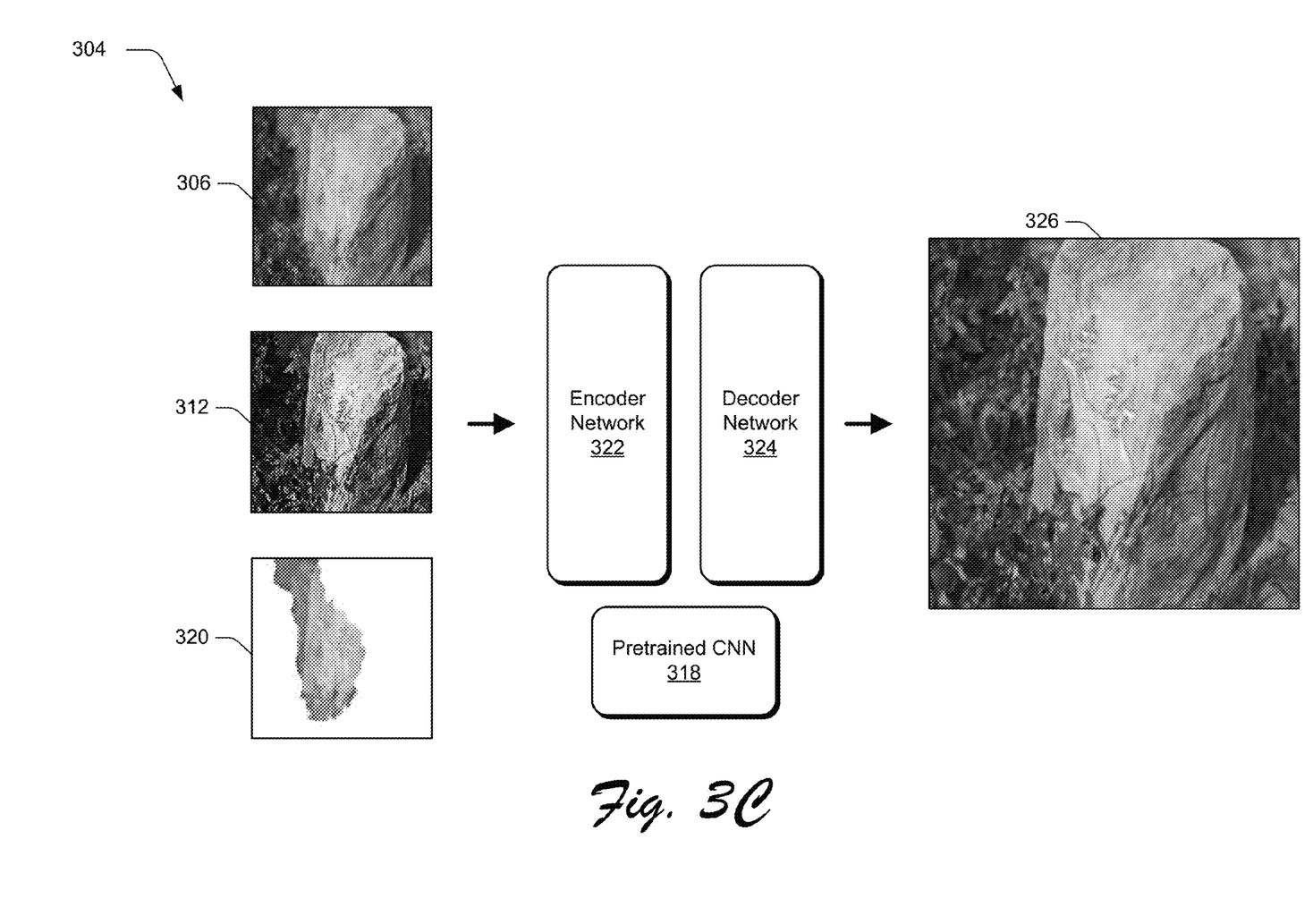

FIGS. 3A, 3B, and 3C illustrate an example of generating a digital image that does not depict light reflected by a surface. FIG. 3A illustrates a representation 300 of predicting an edge map of a transmitted image. FIG. 3B illustrates a representation 302 of predicting a reflected component. FIG. 3C illustrates a representation 304 of generating a corrected digital image.

With reference to FIG. 2 and FIG. 3A, the edge module 202 receives the input data 114 which describes a digital image 306 that depicts light reflected by a surface and light transmitted through the surface. For example, the surface is a window or a transparent wall and the surface is disposed between an image capture device (e.g., a camera) used to capture the digital image 306 and objects depicted in the digital image 306. As shown, the digital image 306 depicts a stone that extends out from the ground, and the stone includes golden glyphs which could indicate a purpose of the stone. For instance, the stone is a memorial which memorializes a person, an event, a location, etc.

Since the surface is between the image capture device and the stone, the image capture device captures the light transmitted through the surface and also the light reflected by the surface. In some examples, the light reflected by the surface includes light generated by the image capture device (e.g., a camera flash). In other examples, the light reflected by the surface and depicted in the digital image 306 is generated from behind the image capture device such as natural light, artificial light, and so forth. Regardless of a source of the light reflected by the surface, the edge module 202 processes the input data 114 using a first machine learning model that includes an encoder network 308 and a decoder network 310. For example, the first machine learning model includes convolutional neural networks as described by Ronneberger et al., *U-Net: Convolutional Networks for Biomedical Image Segmentation*, arXiv:1505.04597v1 [xs.CV] (18 May 2015) with Softmax tied at its end.

In an example, the first machine learning model is trained on a first type of training data to predict edge maps of transmitted images. For a given transmitted image T of a digital image I, it is possible to construct a ground truth edge map ET for the transmitted image T by gray scaling the transmitted image T and computing its normalized gradients (e.g., changes in gray levels in various directions). For instance, the first type of training data includes digital images I and corresponding ground truth edge maps ET of transmitted images T of the digital images I. The first machine learning model is trained by comparing outputs $\widehat{ET}$ of the first machine learning model (e.g., outputs $\widehat{ET}$ of the decoder network 310) with the ground truth edge maps ET of transmitted images T. In one example, the first machine learning model is trained using mean square loss in which a mean square error is minimized between predicted edge maps $\widehat{ET}$ and corresponding ground truth edge maps ET of transmitted images T of the digital images I. In some examples, this is representable as:

$$\text{Loss} = MSE(ET, \widehat{ET}) = \sum \| ET - \widehat{ET} \|^2$$

where: ET represents a gray scale normalized gradient applied on T; and $\widehat{ET}$ represents a predicted edge map for T.

In an example, the first machine learning model of the edge module 202 is trained separately from a second machine learning model of the reflection module 204 and a third machine learning model of the transmission module 206. In this example, the first machine learning model is trained in a first training stage and its weights are frozen after the first training stage. Continuing this example, the second machine learning model and the third machine learning model are jointly trained in a second training stage.

As shown in FIG. 3A, the edge module 202 processes the digital image 306 using the trained first machine learning model to predict an edge map 312 of a transmitted image for the light transmitted through the surface depicted in the digital image 306. The edge map 312 prioritizes a preservation of high-level features and contrasts depicted in the digital image 306. For instance, the edge map 312 does not depict the light reflected by the surface that is depicted in the digital image 306. The edge module 202 generates the edge data 210 as describing the edge map 312.

With reference to FIG. 2 and FIG. 3B, the reflection module 204 receives the input data 114 which describes the digital image 306 that depicts the light reflected by the surface (e.g., the window or transparent wall) and the light transmitted through the surface. The reflection module 204 processes the input data 114 using the second machine learning model which includes an encoder network 314 and a decoder network 316. For example, the second machine learning model also includes convolutional neural networks as described by Ronneberger et al., U-Net: Convolutional Networks for Biomedical Image Segmentation, arXiv: 1505.04597v1 [xs.CV] (18 May 2015) as well as a pretrained convolutional neural network 318. In one example, the pretrained convolutional neural network 318 includes a VGG-16 network that is pretrained on an ImageNet database.

For instance, the second machine learning model is trained on a second type of training data to predict reflected components. The second type of training data includes the synthetic images and the photorealistic images. In this example, the second type of training data includes a ground truth reflected component R and a ground truth transmitted image T for each of the synthetic images. For example, the second machine learning model is not trained on photorealistic images of the second type of training data that do not include a corresponding ground truth reflected component R.

In an example, the second type of training data includes digital images I and corresponding ground truth reflected components R. The second machine learning model outputs predicted reflected components $\hat{R}$ and the second machine learning model is trained using a combination of mean square loss, L–1 loss, and perceptual loss. For example, the reflection module 204 computes the perceptual loss using the pretrained convolutional neural network 318. In some examples, this is representable as:

$$\text{Loss} = MSE(R, \hat{R}) + L1(R, \hat{R}) + \text{Perceptual Loss}(R, \hat{R}) = \alpha \sum \| R - \hat{R} \|^2$$
$$+ \beta \sum \| R - \hat{R} \|^1 + \gamma \sum \sum \lambda_l \| \phi_l(R) - \phi_l(\hat{R}) \|^2$$

where: $\alpha$ is a weight coefficient assigned to the mean square loss; $\beta$ is a weight coefficient assigned to the L–1 loss; $\gamma$ is a weight coefficient assigned to the perceptual loss; $\lambda_l$ is a weighted coefficient assigned to the $l^{th}$ layer of the pretrained convolutional neural network 318; and $\phi_l$ is a result obtained from the $l^{th}$ layer of the pretrained convolutional neural network 318.

As shown in FIG. 3B, the reflection module 204 processes the input data 114 using the trained second machine learning model to predict a reflected component 320. The reflected component 320 depicts the light reflected by the surface (e.g., the window or transparent wall) and the reflected component 320 does not depict the light transmitted through the surface. For example, the reflection module 204 generates the reflection data 212 as describing the reflected component 320.

With reference to FIG. 2 and FIG. 3C, the transmission module 206 receives the input data 114, the edge data 210, and the reflection data 212 and the transmission module 206 processes the input data 114, the edge data 210, and/or the reflection data 212 to generate corrected image data 214. For example, the transmission module 206 concatenates the input data 114, the edge data 210, and the reflection data 212 and processes the concatenated input data 114, edge data 210, and reflection data 212 using the third machine learning model which includes an encoder network 322 and a decoder network 324. In this example, the third machine learning model includes convolutional neural networks as described by Ronneberger et al., U-Net: Convolutional Networks for Biomedical Image Segmentation, arXiv: 1505.04597v1 [xs.CV] (18 May 2015). As shown in FIG. 3C, the representation 304 includes the pretrained convolutional neural network 318 and the transmission module 206 uses the pretrained convolutional neural network 318 to compute a perceptual loss in a manner similar to the manner in which the reflection module 204 computes the perceptual loss for the second machine learning model.

For example, the third machine learning model is trained on the second type of training data to generate corrected images. The third machine learning model is trained against the ground truth transmitted images T in the second type of training data. For instance, an output of the third machine learning model (e.g., an output of the decoder network 324) is a predicted transmitted image T and the third machine learning model is trained using a combination of mean square loss, L–1 loss, and the perceptual loss (computed using the pretrained convolutional neural network 318). In an example, this is representable as:

$$\text{Loss} = MSE(T, \hat{T}) + L1(T, \hat{T}) + \text{Perceptual Loss}(T, \hat{T}) =$$
$$\alpha \sum \| T - \hat{T} \|^2 + \beta \sum \| T - \hat{T} \|^1 + \gamma \sum \sum \lambda_l \| \phi_l(T) - \phi_l(\hat{T}) \|^2$$

where: $\alpha$ is a weight coefficient assigned to the mean square loss; $\beta$ is a weight coefficient assigned to the L−1 loss; $\gamma$ is a weight coefficient assigned to the perceptual loss; $\lambda_l$ is a weighted coefficient assigned to the $l^{th}$ layer of the pretrained convolutional neural network 318; and $\phi_l$ is a result obtained from the $l^{th}$ layer of the pretrained convolutional neural network 318.

As noted previously, the second machine learning model and the third machine learning model are jointly trained on the second type of training data in some examples. Using the edge data 210 and the reflection data 212 as priors, the third machine learning model learns to remove the $\hat{R}$ component from digital images I while preserving contrast and details around $\widehat{ET}$ which improves performance of the described systems for single image reflection removal relative to conventional systems. By including both the edge data 210 and the reflection data 212 as priors, the described systems are capable of generating digital images with removed reflections from artificial lighting, natural lighting, throbbing/pulsating glares, and so forth.

The trained third machine learning model processes the input data 114, the edge data 210, and/or the reflection data 212 to generate a corrected digital image 326. As shown, the corrected digital image 326 depicts the light transmitted through the surface (the window or transparent wall) and the corrected digital image 326 does not depict the light reflected by the surface. For instance, the transmission module 206 generates the corrected image data 214 as describing the corrected digital image 326. The display module 208 receives the corrected image data 214 and the display module 208 processes the corrected image data 214 to display the corrected digital image 326, for example, in the user interface 120 of the display device 106.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
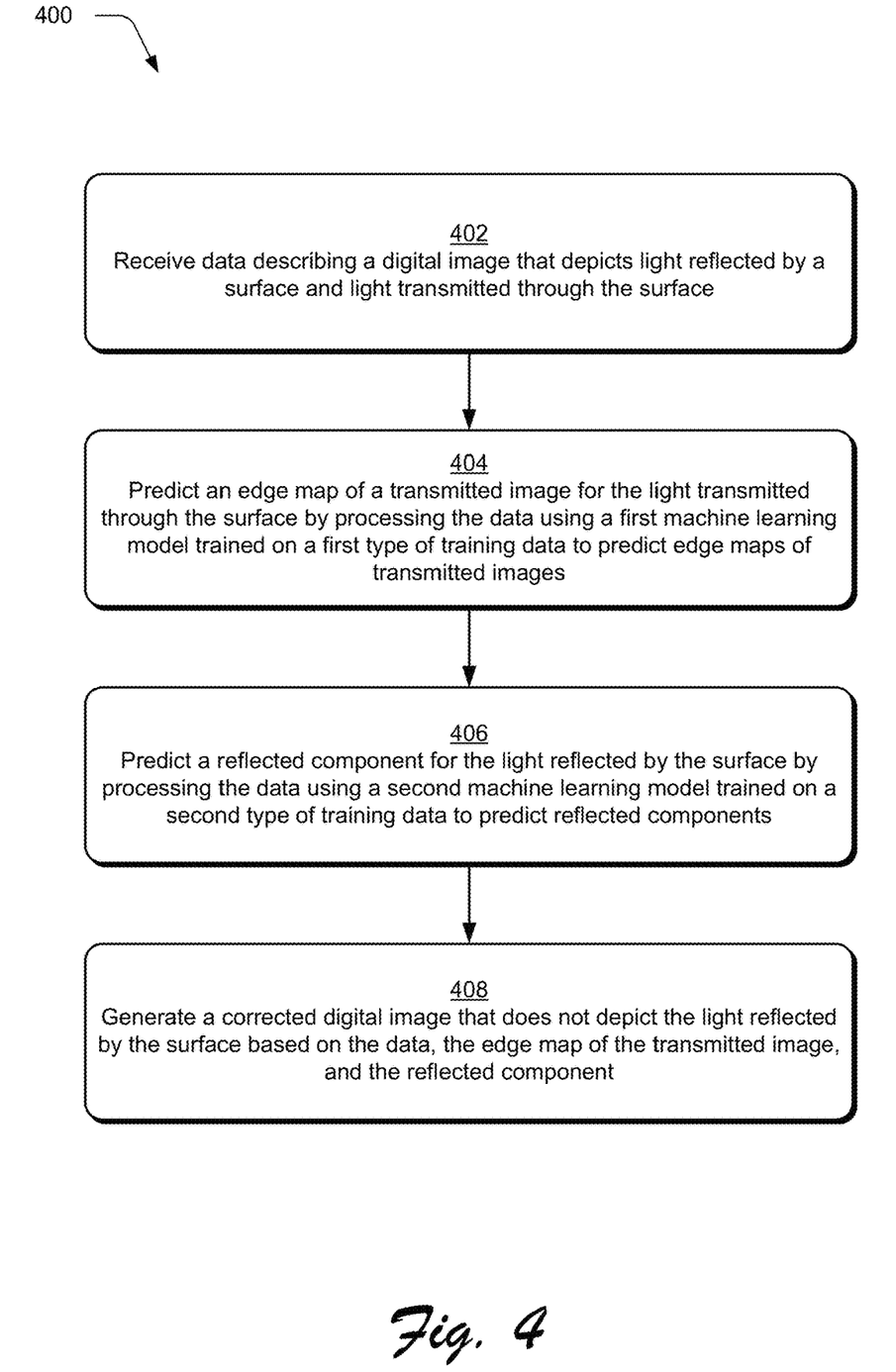
FIG. 4 is a flow diagram depicting a procedure in an example implementation in which data is received describing a digital image that depicts light reflected by a surface and light transmitted through the surface and a corrected digital image is generated that does not depict the light reflected by the surface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which data is received describing a digital image that depicts light reflected by a surface and light transmitted through the surface and a corrected digital image is generated that does not depict the light reflected by the surface.

Data describing a digital image that depicts light reflected by a surface and light transmitted through the surface is received (block 402). The computing device 102 implements the removal module 110 to receive the data in some examples. An edge map is predicted of a transmitted image for the light transmitted through the surface by processing the data using a first machine learning model trained on a first type of training data to predict edge maps of transmitted images (block 404). For example, the removal module 110 predicts the edge map for the transmitted image using the first machine learning model.

A reflected component is predicted for the light reflected by the surface by processing the data using a second machine learning model trained on a second type of training data to predict reflected components (block 406). In some examples, the removal module 110 predicts the reflected component using the second machine learning model. A corrected digital image is generated (block 408) that does not depict the light reflected by the surface based on the data, the edge map of the transmitted image, and the reflected component. For example, the removal module 110 generates the corrected digital image based on the data, the edge map of the transmitted image, and the reflected component.

Example System and Device

Figure 5:
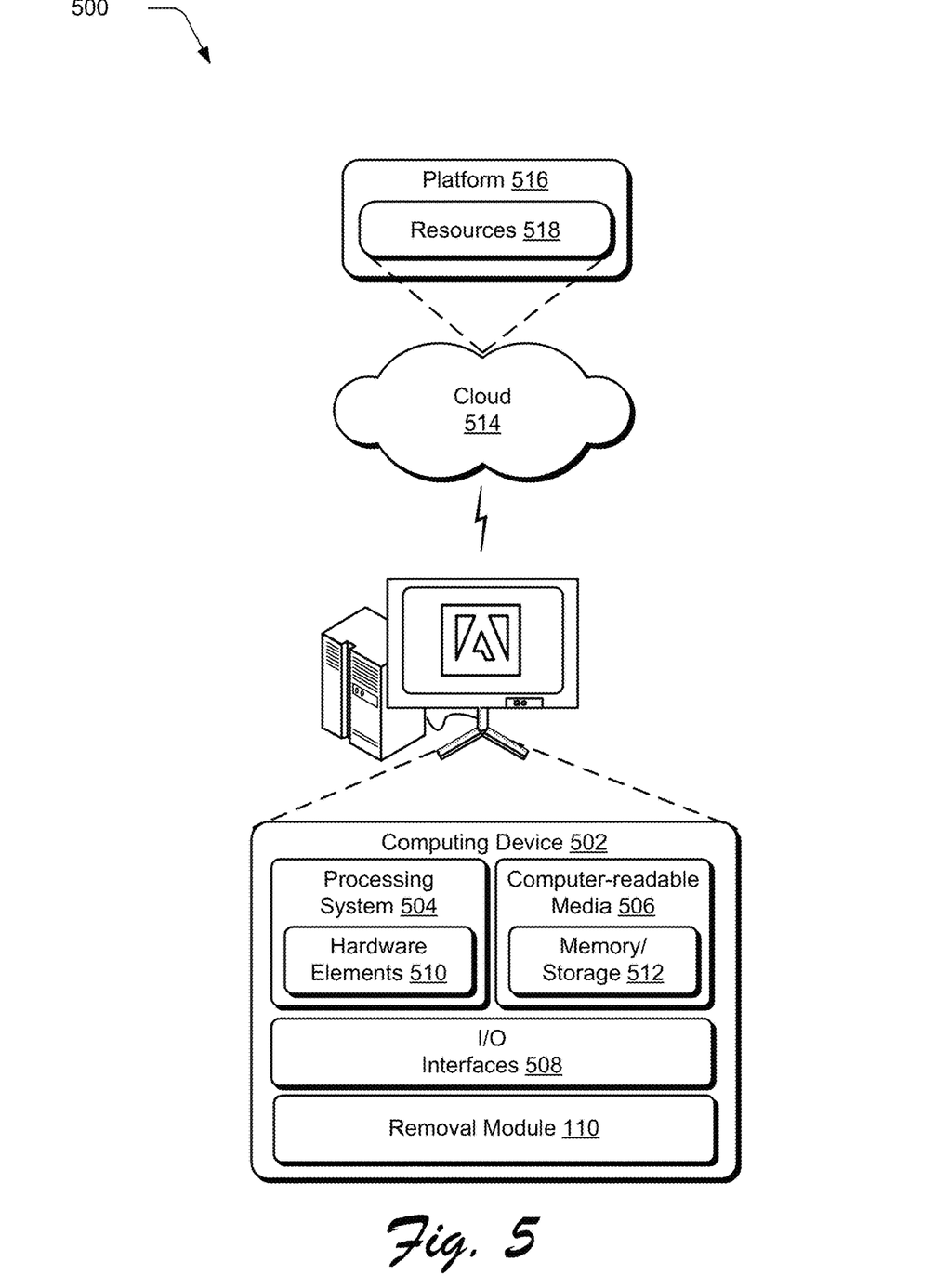
FIG. 5 illustrates an example system that includes an example computing device that is representative of one or more computing systems and/or devices for implementing the various techniques described herein.

FIG. 5 illustrates an example system 500 that includes an example computing device that is representative of one or more computing systems and/or devices that are usable to implement the various techniques described herein. This is illustrated through inclusion of the removal module 110. The computing device 502 includes, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that are configured as processors, functional blocks, and so forth. This includes example implementations in hardware as an application specific integrated circuit or other logic device formed using one or more semiconductors. The hardware elements 510 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 506 is illustrated as including memory/storage 512. The memory/storage 512 represents memory/storage capacity associated with one or more computer-readable media. In one example, the memory/storage 512 includes volatile media (such as random access memory (RAM)) and/or nonvolatile media (such as read only memory (ROM), Flash memory, optical disks, magnetic disks, and so forth). In another example, the memory/storage 512 includes fixed media (e.g., RAM, ROM, a fixed hard drive, and so on) as well as removable media (e.g., Flash memory, a removable hard drive, an optical disc, and so forth). The computer-readable media 506 is configurable in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 502. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 502, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 510. For example, the computing device 502 is configured to implement particular instructions and/or functions corresponding to the software and/or hardware modules. Accordingly, implementation of a module that is executable by the computing device 502 as software is achieved at least partially in hardware, e.g., through use of computer-readable storage media and/or hardware elements 510 of the processing system 504. The instructions and/or functions are executable/operable by one or more articles of manufacture (for example, one or more computing devices 502 and/or processing systems 504) to implement techniques, modules, and examples described herein.

The techniques described herein are supportable by various configurations of the computing device 502 and are not limited to the specific examples of the techniques described herein. This functionality is also implementable entirely or partially through use of a distributed system, such as over a "cloud" 514 as described below.

The cloud 514 includes and/or is representative of a platform 516 for resources 518. The platform 516 abstracts underlying functionality of hardware (e.g., servers) and software resources of the cloud 514. For example, the resources 518 include applications and/or data that are utilized while computer processing is executed on servers that are remote from the computing device 502. In some examples, the resources 518 also include services provided over the Internet and/or through a subscriber network, such as a cellular or Wi-Fi network.

The platform 516 abstracts the resources 518 and functions to connect the computing device 502 with other computing devices. In some examples, the platform 516 also serves to abstract scaling of resources to provide a corresponding level of scale to encountered demand for the resources that are implemented via the platform. Accordingly, in an interconnected device embodiment, implementation of functionality described herein is distributable throughout the system 500. For example, the functionality is implementable in part on the computing device 502 as well as via the platform 516 that abstracts the functionality of the cloud 514.

CONCLUSION

Although implementations of systems for single image reflection removal have been described in language specific to structural features and/or methods, it is to be understood that the appended claims are not necessarily limited to the specific features or methods described. Rather, the specific features and methods are disclosed as example implementations of systems for single image reflection removal, and other equivalent features and methods are intended to be within the scope of the appended claims. Further, various different examples are described and it is to be appreciated that each described example is implementable independently or in connection with one or more other described examples.

What is claimed is:

1. A method implemented by a computing device, the method comprising:
   receiving data describing a digital image that includes a depiction of light reflected by a surface and light transmitted through the surface;
   predicting, by a first machine learning model, an edge map of a transmitted image for the light transmitted through the surface by processing the data using the first machine learning model trained to predict edge maps of transmitted images;
   predicting, by a second machine learning model, a reflected component for the light reflected by the surface by processing the data using the second machine learning model trained to predict reflected components;
   receiving, by a third machine learning model, the data, the edge map from the first machine learning model, and the reflected component from the second machine learning model; and
   generating, by the third machine learning model, a corrected digital image that removes at least a portion of the depiction of the light reflected by the surface based on the data, the edge map, and the reflected component.

2. The method as described in claim 1, wherein the corrected digital image is generated using the third machine learning model trained on the training data used to predict reflected components by the second machine learning model to generate corrected digital images.

3. The method as described in claim 2, wherein the second machine learning model and the third machine learning model are jointly trained on the training data.

4. The method as described in claim 3, wherein the second machine learning model and the third machine learning model are jointly trained to minimize a perceptual loss that is computed using a pretrained convolutional neural network.

5. The method as described in claim 3, further comprising concatenating the digital image, the edge map of the transmitted image, and the reflected component.

6. The method as described in claim 1, wherein training data used to train the second machine learning model includes synthetic images and photorealistic images.

7. The method as described in claim 1, wherein training data used to train the first machine learning model includes edge maps constructed from transmitted images.

8. The method as described in claim 1, wherein the first machine learning model is trained separately from the second machine learning model.

9. The method as described in claim 1, wherein the first machine learning model is trained to minimize a mean square loss.

10. A system comprising:
    an edge module implementing a first machine learning model to:
      receive data describing a digital image that depicts light reflected by a surface and light transmitted through the surface; and
      predict an edge map of a transmitted image for the light transmitted through the surface using one or more machine learning models;
    a reflection module implementing a second machine learning model to predict a reflected component for the light reflected by the surface by processing the data; and
    a transmission module implementing a third machine learning model to receive the data, the edge map from the first machine learn model, and the reflected component from the second machine learning model and generate a corrected digital image that reduces an appearance of the light reflected by the surface based on the data, the edge map, and the reflected component.

11. The system as described in claim 10, wherein the edge map is predicted using the first machine learning model, the reflected component is predicted using the second machine learning model, and the corrected digital image is generated using the third machine learning model.

12. The system as described in claim 11, wherein the second machine learning model and the third machine learning model are jointly trained.

13. The system as described in claim 11, wherein training data used to train the first machine learning model includes edge maps constructed from transmitted images.

14. The system as described in claim 11, wherein training data used to train the second machine learning model includes synthetic images and photorealistic images.

15. One or more computer-readable storage media that is non-transitory and storing instructions stored that, responsive to execution by a processing device, causes the processing device to perform operations comprising:
    receiving data describing a digital image that depicts light reflected by a surface and light transmitted through the surface;
    predicting an edge map of a transmitted image for the light transmitted through the surface by processing the data using a first machine learning model;
    predicting a reflected component for the light reflected by the surface by processing the data using a second machine learning model;
    receiving at a third machine learning model the data, the edge map from the first machine learning model and the reflected component from the second machine learning model; and
    generating a corrected digital image that reduces an appearance of the light reflected by the surface by processing the data, the edge map, and the reflected component using the third machine learning model.

16. The one or more computer-readable storage media as described in claim 15, wherein the second machine learning model and the third machine learning model are jointly trained.

17. The one or more computer-readable storage media as described in claim 16, wherein the second machine learning model and the third machine learning model are jointly trained to minimize a perceptual loss that is computed using a pretrained convolutional neural network.

18. The one or more computer-readable storage media as described in claim 15, wherein the operations further include concatenating the digital image, the edge map of the transmitted image, and the reflected component.

19. The one or more computer-readable storage media as described in claim 15, wherein the first machine learning model is trained separately from the second machine learning model and the third machine learning model.

20. The one or more computer-readable storage media as described in claim 15, wherein the first machine learning model is trained to minimize a mean square loss.

\* \* \* \* \*